(No Model.)
W. ENGBERG.
VALVE GEAR.
No. 533,283. Patented Jan. 29, 1895.
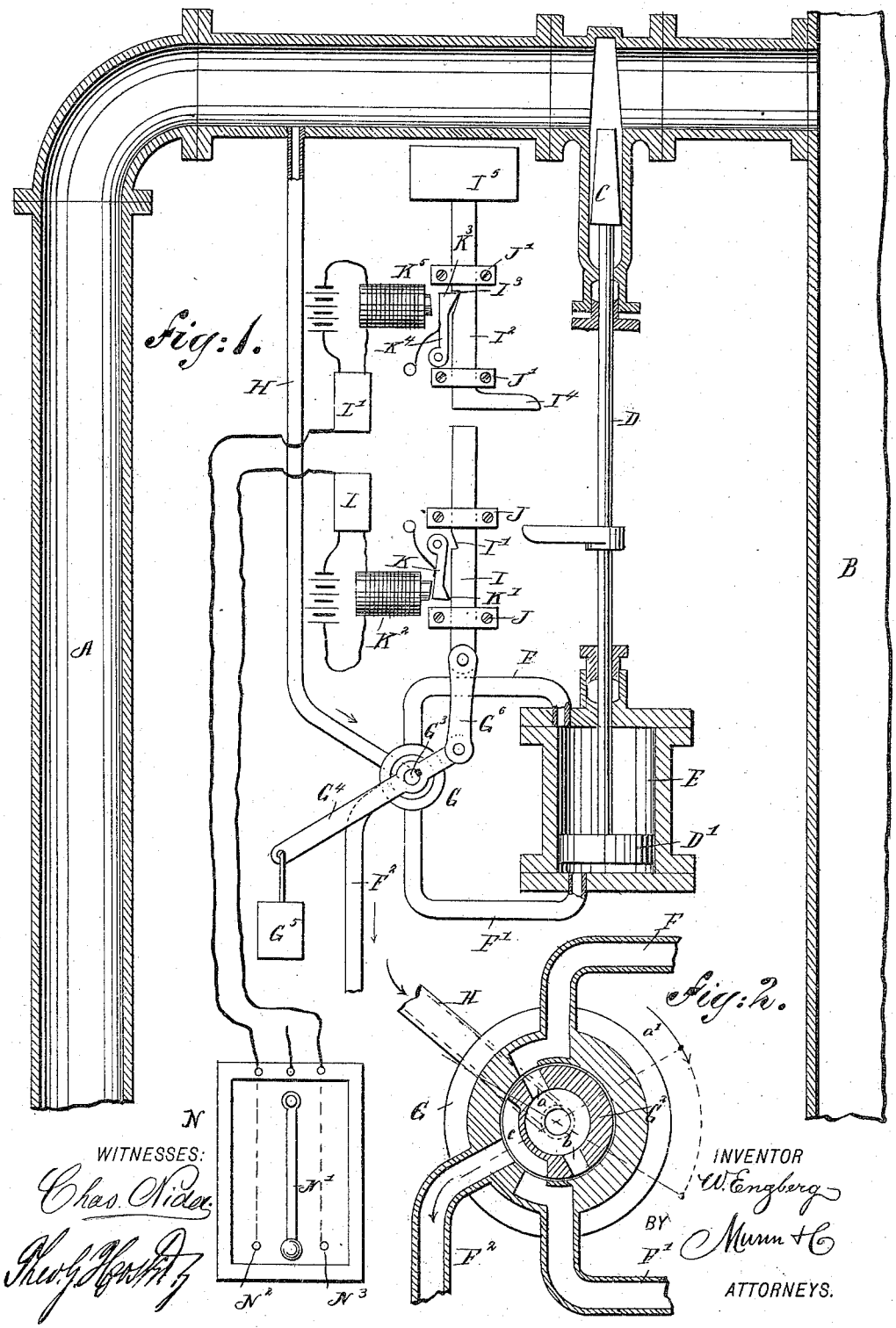
WITNESSES:
INVENTOR
W. Engberg
BY
Munn & Co
ATTORNEYS.

UNITED STATES PATENT OFFICE.

WILLIAM ENGBERG, OF ST. JOSEPH, MICHIGAN.

VALVE-GEAR.

SPECIFICATION forming part of Letters Patent No. 533,283, dated January 29, 1895.

Application filed August 9, 1894. Serial No. 519,862. (No model.)

*To all whom it may concern:*

Be it known that I, WILLIAM ENGBERG, of St. Joseph, in the county of Berrien and State of Michigan, have invented a new and Improved Valve-Gear, of which the following is a full, clear, and exact description.

The object of the invention is to provide a new and improved valve gear, actuated by fluid pressure and controlled by electric devices, the said valve gear being more especially designed for use in supply pipes, connecting a pumping station with a distant stand pipe, to enable the engineer in charge of the pumping station to open or close the supply pipe, and thereby connect the latter with the stand pipe, or disconnect it therefrom.

The invention consists of a cylinder containing a piston for opening or closing the valve in the supply pipe, a valve connected with a liquid supply and also connected with the said cylinder, and a device electrically controlled and connected with the said valve to open or close the latter at either end of the cylinder.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in both the figures.

Figure 1 is a sectional side elevation of the improvement; and Fig. 2 is an enlarged sectional side elevation of the valve.

The device, as illustrated in the drawings, is applied to a supply pipe A, connected in the usual manner with the stand pipe B, located a suitable distance from the pumping station. In the supply pipe A, near the stand pipe B, is arranged a gate-valve C, held on the upper end of a piston rod D, passing through suitable stuffing boxes in the valve casing, and in stuffing boxes attached to the cylinder E containing a piston D' carrying the said piston rod D.

The upper and lower ends of the cylinder E, are connected by pipes F and F' with the casing G' of a valve G, containing a hollow valve plug $G^2$ connected with a small supply pipe H leading to the supply pipe A, so that water under pressure can pass through the pipe H, into the valve plug $G^2$. The latter is provided, within the casing G', with the oppositely arranged ports $a$ and $b$, adapted to alternately register with the pipes F and F' respectively, as will be readily understood by reference to Fig. 2.

In the exterior surface of the valve plug $G^2$, is arranged a channel $c$ adapted to alternately connect the pipes F and F' with a discharge pipe $F^2$, held in the valve casing G'. The stem $G^3$ of the valve plug $G^2$, carries a lever $G^4$, supporting at one end a weight $G^5$ and connected at its other end by a link $G^6$ with a bar I fitted to slide in bearings J, attached to a frame or other suitable support. On one side of the bar I, is formed a notch I' adapted to be engaged by the hook end K' of a spring-pressed armature lever K, adapted to operate in conjunction with an electro magnet $K^2$ having its wires connected with a relay L, connected with a switch N, located at a distant pumping station, so as to be under the control of the engineer in charge of the station.

In alignment with the bar I and in close proximity thereto, is arranged a second bar $I^2$, fitted to slide in bearings J', and provided with a notch $I^3$, adapted to be engaged by the hook end $K^3$ of the spring-pressed armature lever $K^4$, operating in conjunction with an electro magnet $K^5$, connected with a relay L', likewise connected with the switch N. The switch lever N', is adapted to be moved to the contact points $N^2$ and $N^3$, for the relays L and L' respectively, so as to close the circuit for either relay and to cause the corresponding electro magnet $K^2$ or $K^5$, to attract its armature lever K or $K^4$ respectively.

On the lower end of the bar $I^2$, is arranged a projection or foot $I^4$, adapted to be engaged by an arm $D^2$, secured on the piston rod D between the cylinder E and the casing of the valve C. The upper end of the bar $I^2$, carries a weight $I^5$, adapted to rest on the upper bearing J'.

The operation is as follows: When the several parts are in the position illustrated in the drawings, the valve C is open, and water can flow through the supply pipe A, into the stand pipe B. The piston D' is in a lowermost position in the cylinder E, and the valve G has the plug $G^2$ in the position shown in Fig. 2, so that water from the supply pipe A passing through the pipe H and plug $G^2$, can pass through the port $a$ and pipe F, into the cylinder E, to hold the piston $D'$, in its lowermost position, and consequently, the valve C, in an open position. The plug $G^2$ is locked in the position described by the weight $G^5$ bearing on the valve arm $G^4$ and holding the bar I unlocked in its elevated position. The other weighted bar $I^2$ is locked in an elevated position by the hooked end $K^3$ of the armature lever $K^4$, engaging with the notch $I^3$ of the said bar $I^2$. Now when the engineer in charge of the pumping station, desires to close the valve C in the supply pipe A, for any reason whatever, he moves the switch lever $N'$ to the left, onto the contact point $N^2$, to close the circuit for the relay $L'$, to cause the electro magnet $K^5$, to attract the armature lever $K^4$, whereby the bar $I^2$ is unlocked, and consequently slides downward by the action of the weight $I^5$. The foot $I^4$ strikes the upper end of the bar $I^2$, moves the latter downward so that a swinging motion is given to the lever $G^4$, which turns the plug $G^2$ in the valve casing. The plug $G^2$ is turned in the direction of the arrow $a'$, so that the port $a$ is disconnected from the pipe F, and the port $b$ connects with the pipe $F'$. The channel $c$, which before connected the pipe F with the discharge pipe $F^2$ now connects the latter with the pipe F. Water now passing into the plug $G^2$ by the pipe H through the supply pipe A, flows through the port $b$ into the pipe $F'$ and to the lower end of the cylinder E, to force the piston $D'$ therein, upward, so as to close the valve C, in the supply pipe A. It will be seen that when the piston $D'$ moves upward, the water in the upper end of the cylinder D is discharged through the pipe F, channel $c$ and discharge pipe $F^2$. The upward movement of the piston $D'$, also causes arm $D^2$ on the piston-rod D to engage the foot $I^4$ of bar $I^2$ so that the latter is raised and held in its elevated position by the upward pressure of the water in cylinder E under the piston $D'$. The next movement of the switch arm $N'$ will be to the right, which will break the circuit through the magnet $K^5$ and allow the hook $K^3$ on the lever $K^4$ to engage notch $I^3$ whereby bar $I^2$ will be locked in its elevated position. When the bar I is forced downward by bar $I^2$ as above described, it is finally locked in its lowered position by the hooked end K of lever $K'$ snapping into the notch $I'$ whereby the valve is held locked and the weight $G^5$ raised. Now, when it is desired to again open the valve C in the stand pipe A, the operator moves the switch lever $N'$, from the normal position, to the contact point $N^3$, to close the circuit for the relay L, so that the electro magnet $K^2$ attracts the armature lever K and moves the hook end $K'$ out of engagement with the notch $I'$, to unlock the bar I and the valve G. The weight $G^5$ now moves downward so that a swinging motion is given to the lever $G^4$, whereby the plug $G^2$ is turned in the inverse direction of the arrow $a'$. This movement of the plug $G^2$ again connects the port $a$ with the pipe F, and disconnects the port $b$ from the pipe $F'$, while the channel $c$, again connects the pipes $F'$ and $F^2$, as shown in Fig. 2. The water in the lower end of the cylinder E, can now escape through the pipe $F'$, channel $c$ and pipe $F^2$, while water under pressure passes into the upper end of the cylinder to force the piston $D'$ downward, and to open the valve C. The operator always returns the switch lever N to the normal position shown in the drawings after the circuit is temporarily closed.

It will be seen that by the arrangement described, the valve C is completely under the control of the engineer in charge of the station, located at a distant place.

Having thus fully described my invention, I claim as new and desire to secure by Letters Patent—

1. The combination of two electric circuits each including a magnet having an armature lever, two longitudinally movable bars adapted to engage one another and to be engaged and locked by the respective armature levers, means for moving said bars, when released in opposite directions, a valve connected to one of the bars and adapted to be actuated when the same is moved, and means for exciting said magnets alternately, substantially as set forth.

2. In a valve operating mechanism, the combination of a valve adapted to be locked in different positions, means for unlocking the valve, a lever fulcrumed to the stem thereof, a weight connected to one arm of the lever, an excessive weight adapted to be applied over the other arm of the lever, and means actuated by the movement of the valve for removing said weight, substantially as set forth.

3. The combination of two electric circuits each including a magnet having an armature lever, two longitudinally movable bars adapted to engage one another and to be engaged and locked to the respective armature levers, means for moving said bars toward one another, when released, a valve connected to one of the bars and adapted to be actuated when the same is moved, means actuated by the movement of the valve for moving the other bar in the reverse direction, and means for exciting said magnets alternately, substantially as set forth.

4. A valve operating mechanism, comprising an electric circuit, a magnet and a switch-device included therein an armature for the magnet, a bar adapted to be engaged and held against movement by said armature, a valve connected to said bar and adapted to be actuated thereby, means for automatically moving said bar in one direction when the same is disengaged from the said armature, and a movable weight adapted when released, to move said bar in the opposite direction.

5. A valve operating mechanism comprising an electric circuit, a magnet and a switch-device included therein, an armature for the magnet, a bar adapted to be engaged and held against vertical movement by said armature, a valve connected to the bar, a cylinder having ports controlled by said valve, a piston in the cylinder, a piston-rod and a weight adapted to be elevated by the upward movement of said piston-rod, said weight being adapted when released, to move the said bar in one direction, and means for automatically moving said bar in the reverse direction when said weight is in its elevated position, substantially as set forth.

6. A valve operating mechanism, comprising a valve, a lever connected to the stem thereof, and provided with a weight, a bar coupled to said lever and adapted to be upheld normally thereby, a weight arranged over said bar and adapted when released to depress the same, a cylinder having ports controlled by said valve, a piston arranged in the cylinder and a piston-rod adapted to engage said weight and elevate the same when the piston moves in the cylinder, substantially as set forth.

7. A valve operating mechanism, comprising two electro-magnets, each provided with an armature lever, a circuit and switch-device for each magnet, a bar adapted to be engaged and held against movement by one of the armature levers, a valve connected to said bar and adapted to be actuated thereby, means for automatically moving said bar in one direction when the same is disengaged from said armature lever, and a movable weight engaged and held by the other armature lever and adapted when released to move said bar in the opposite direction, substantially as set forth.

8. A valve operating mechanism comprising an electric circuit, a magnet and a switch device included therein, an armature for said magnet, a slidable bar adapted to be engaged and held in one position by said armature, a valve, a lever connected to the stem thereof and coupled at one end to the said bar, a weight connected to the said lever and adapted to automatically move the bar and actuate the valve when the switch device is actuated to close the circuit and means controlled by the movement of the said valve for moving said bar into position to be engaged by the armature, substantially as set forth.

9. A valve operating mechanism comprising an electric circuit, a magnet and a switch-device included therein, an armature for said magnet, a bar adapted when in one position to be engaged and held against movement by said armature, a valve connected to the bar and adapted to be operated thereby, a movable weight adapted when released to move said bar in one direction, automatic means for moving the bar in the other direction when released, from said armature lever and means actuated by the operation of said valve, for settling said weight in its operative position, substantially as set forth.

WILLIAM ENGBERG.

Witnesses:
BENJ. FUSS,
ALFRED BALDNY.